(12) United States Patent
Uchizawa et al.

(10) Patent No.: US 9,097,836 B2
(45) Date of Patent: Aug. 4, 2015

(54) METHOD FOR PRODUCING METHACRYLIC RESIN FOR OPTICAL FILM

(71) Applicants: JX Nippon Oil & Energy Corporation, Tokyo (JP); Keio University, Tokyo (JP)

(72) Inventors: Sayako Uchizawa, Tokyo (JP); Akira Matsuo, Tokyo (JP); Yasuo Matsumura, Tokyo (JP); Ayumu Komata, Tokyo (JP)

(73) Assignees: JX Nippon Oil & Energy Corporation, Tokyo (JP); KEIO UNIVERSITY, Tokyo (JP)

( * ) Notice: Subject to any disclaimer, the term of this patent is extended or adjusted under 35 U.S.C. 154(b) by 0 days.

(21) Appl. No.: 14/360,010

(22) PCT Filed: Nov. 6, 2012

(86) PCT No.: PCT/JP2012/078715
§ 371 (c)(1),
(2) Date: May 22, 2014

(87) PCT Pub. No.: WO2013/077180
PCT Pub. Date: May 30, 2013

(65) Prior Publication Data
US 2014/0316090 A1     Oct. 23, 2014

(30) Foreign Application Priority Data
Nov. 25, 2011   (JP) ................. 2011-257394

(51) Int. Cl.
*G02B 1/04*      (2006.01)
*C08F 2/20*      (2006.01)
*C08F 220/06*    (2006.01)
*C08F 220/14*    (2006.01)

(52) U.S. Cl.
CPC ... *G02B 1/04* (2013.01); *C08F 2/20* (2013.01); *C08F 220/06* (2013.01); *C08F 220/14* (2013.01)

(58) Field of Classification Search
CPC ........... G02B 1/04; C08F 2/20; C08F 220/06; C08F 220/14
USPC .............................. 526/216, 233, 234, 317.1
See application file for complete search history.

(56) References Cited

U.S. PATENT DOCUMENTS

2008/0154008 A1*  6/2008  Jeong et al. ................ 526/329.7

FOREIGN PATENT DOCUMENTS

| JP | H05-155907 A |   | 6/1993 |
| JP | 07145214 A | * | 6/1995 |
| JP | H07-145214 A |   | 6/1995 |
| JP | 2000-086804 A |   | 3/2000 |
| JP | 2000-159821 A |   | 6/2000 |
| JP | 2000-159822 A |   | 6/2000 |
| JP | 2010-514884 A |   | 5/2010 |

OTHER PUBLICATIONS

Int'l Search Report issued Feb. 12, 2013 in Int'l Application No. PCT/JP2012/078715.

* cited by examiner

*Primary Examiner* — Michael M Bernshteyn
(74) *Attorney, Agent, or Firm* — Panitch Schwarze Bellisario & Nadel LLP

(57) ABSTRACT

The present invention can provide a methacrylic resin which has excellent transparency and color and less defects such as fish eyes and thus suitable for optical films by adding (A) a polymeric dispersant represented by formula (1) below and (B) an inorganic salt and/or organic salt selected from alkali metal salts, alkaline earth metal salts and ammonium salts when methyl methacrylate alone or a monomer mixture containing methyl methacrylate as one component is subjected to suspension-polymerization:

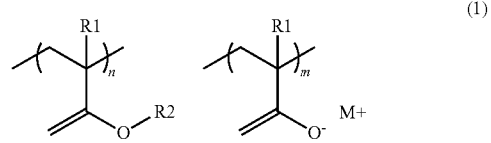

($n$=10 to 60 mol %, $m$=40 to 90 mol %, $R_1$ is hydrogen or a methyl group, $R_2$ is an alkyl group having 1 to 8 carbon atoms, and M is an alkali metal or alkaline earth metal or $NH_4$.)

2 Claims, No Drawings

METHOD FOR PRODUCING METHACRYLIC RESIN FOR OPTICAL FILM

CROSS-REFERENCE TO RELATED APPLICATION

This application is a Section 371 of International Application No. PCT/JP2012/078715, filed Nov. 6, 2012, which was published in the Japanese language on May 30, 2013, under International Publication No. WO 2013/077180 A1 and the disclosure of which is incorporated herein by reference.

TECHNICAL FIELD

The present invention relates to a method for producing methacrylic resins for optical films, in particular to a method for producing a methacrylic resin (fine particles) for optical films that can be shaped into various optical components with excellent transparency and chromaticity.

BACKGROUND ART

Methacrylic resin has been widely used for automobile parts, optical components and the like because it has excellent optical properties in combination with remarkable weather resistance and high mechanical properties. These parts and components are required to have high transparency and chromaticity.

Examples of methods for producing methacrylic resin include bulk polymerization, solution polymerization and suspension polymerization methods. Generally, in order to produce methacrylic resin with excellent transparency and less impurities, bulk polymerization and solution polymerization are preferably used, but suspension polymerization has now been frequently used because it is easy to change varieties and thus suitable for the production of a wide variety of products in small quantities.

Conventionally, in the case of producing methacrylic resin with a suspension polymerization method, polymeric dispersants such as polyvinyl alcohol or poor water solubility inorganic salts such as calcium phosphate, hydroxyapatite, and magnesium pyrophosphate have been used as a dispersion stabilizer.

However, the use of methacrylic resin particles produced using a polyvinyl alcohol or an inorganic salt for the production of an optical component such as a film usable for a liquid crystal display or a light guide plate causes the dispersant incorporated in the fine particles of the resin to raise problems such as clouding, yellowing, or fish eyes. That is, in the field of optics where high transparency is required, a resin produced using a conventional dispersant cannot be used. A dispersant has been, therefore, desired, which does not impair the original transparency of a resin when shaped and contributes to the stable production of particles upon suspension polymerization.

Upon production of resin for optical applications with a suspension polymerization method, the use of sodium p-styrenesulfonate as a dispersant has also been known, but is not suitable for optical applications where excellent chromaticity is required because the resulting resin colors to yellow (for example, see Patent Literature 1 below).

CITATION LIST

Patent Literature

Patent Literature 1: Japanese Patent Application Laid-Open Publication No. 07-145214

SUMMARY OF INVENTION

Technical Problem

The present invention has an object to provide a method for producing a superior methacrylic resin, which has excellent transparency and color when formed into a film and is less in defects such as fish eyes.

Solution to Problem

As the results of extensive studies of the above object, the present invention has been accomplished on the basis of the finding that the object can be achieved by carrying out suspension polymerization in the presence of (A) a specific polymeric dispersant and (B) an inorganic salt and/or organic salt selected from alkali metal salts, alkaline earth metal salts and ammonium salts.

That is, the present invention relates to a method for producing a methacrylic resin for an optical film, comprising adding (A) a polymeric dispersant represented by formula (1) below and (B) an inorganic salt and/or organic salt selected from alkali metal salts, alkaline earth metal salts and ammonium salts when methyl methacrylate alone or a monomer mixture containing methyl methacrylate as one component is subjected to suspension-polymerization:

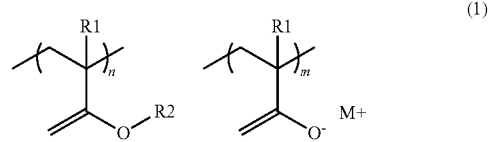

(1)

($n$=10 to 60 mol %, $m$=40 to 90 mol %, $R_1$ is hydrogen or a methyl group, $R_2$ is an alkyl group having 1 to 8 carbon atoms, and M is an alkali metal or alkaline earth metal or $NH_4$.)

Advantageous Effect of Invention

The polymeric dispersant referred to as Component (A) used in the method of the present invention has a hydrophobic portion and a hydrophilic portion, and thus can stably disperse a monomer oil in a polymerization system, and also can produce a shaped product, which is extremely unlikely to be clouded (haze) and yellowing when used for suspension polymerization to produce acrylic resin. Furthermore, in the present invention, a polymerization reaction upon production of the resin (fine particles) is extremely stable so as to be able to produce fine particles with a uniform particle diameter. The resulting resin (fine particles) has excellent transparency and color and less defects such as fish eyes when formed into a film by melt extrusion. The film formed from the resin produced by the present invention is extremely small in haze value and thus can be used suitably as an optical film such as a polarizer protection film or a optical compensation retardation film for a liquid crystal display.

DESCRIPTION OF EMBODIMENTS

The present invention will be described in detail below.

The polymeric dispersant (A) used in the present invention is a polymer comprising structural units represented by formula (1) below.

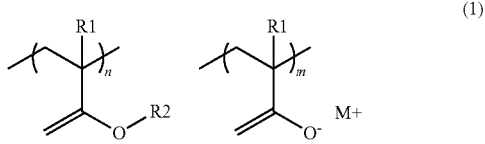
(1)

In formula (1), n=10 to 60 mol %, and m=40 to 90 mol %. The structural units represented by formula (1) do not mean a block copolymer, and n and m indicate the content ratio of the two structural units, respectively. $R_1$ is hydrogen or a methyl group, $R_2$ is an alkyl group having 1 to 8 carbon atoms, and M is an alkali metal or alkaline earth metal such as lithium, sodium, potassium, and calcium, or $NH_4$.

The polymeric dispersant (A) is a water soluble polymer comprising 40 to 90 mol % of an acrylic acid salt unit and/or methacrylic acid salt unit of at least one type selected from lithium, sodium, potassium, calcium and ammonium salts of acrylic acid and/or methacrylic acid and 10 to 60 mol % of an acrylic acid alkyl ester unit and/or methacrylic acid alkyl ester unit, having an alkyl group having 1 to 8 carbon atoms.

The ratio of the acrylic acid salt unit and/or methacrylic acid salt unit in the dispersant is desirously from 40 to 90 mol %, more desirously from 60 to 70 mol %. If the ratio is less than 40 mol %, the resulting formed product would be degraded in color. If the ratio is greater than 90 mol %, monomer droplets may not be dispersed stably upon polymerization depending on the conditions thereof.

The polymeric dispersant (A) is added in an amount of preferably from 0.001 to 1 part by weight, more preferably 0.005 to 0.5 part by weight on the basis of 100 parts by weight of water. If the polymeric dispersant is added in an amount of less than 0.001 part by weight, the resulting resin would be inhomogeneous in shape (fine particles) or the unification of the particles would be caused. If the polymeric dispersant is added in an amount of more than 1 part by weight, the formation of the resin would not be affected but bubbling would be likely to occur in the polymerization system or the dispersant is likely to be a cause of fish eyes in the resin.

In the present invention, the viscosity of the polymeric dispersant (A) in an amount of 16.5 percent by mass is preferably from 50 to 800 mPas, more preferably from 100 to 600 mPas, more preferably from 200 to 500 mPas.

Examples of the inorganic salt and/or organic salt (B) that is an alkali metal salt, alkaline earth metal salt, or ammonium salt used in the present invention include sodium, potassium, calcium and ammonium salts of inorganic acids such as hydrochloric acid, sulfuric acid, nitric acid, phosphoric acid, carbonic acid, boric acid and of organic acids such as citric acid, acetic acid, lactic acid and tartaric acid.

The inorganic salt and/or organic salt (B) is added in an amount of preferably from 0.01 to 2 part by weight, more preferably from 0.05 to 1 part by weight on the basis of 100 parts by weight of water. If the inorganic salt and/or organic salt (B) is added in an amount of less than 0.01 part by weight, the resulting resin would be inhomogeneous in beads shape or diameter or the salt would cause the particles to be unified mutually. If the inorganic salt and/or organic salt (B) is added in an amount of more than 2 parts by weight, it would adversely affect on the optical properties of the resulting copolymer.

In the present invention, the above-described polymeric dispersant (A) and the above-described inorganic salt and/or organic salt (B) is added, followed by suspension-polymerization of methyl methacrylate alone or a monomer mixture containing methyl methacrylate as the main component and other monomer that is copolymerizable therewith, thereby producing a methacrylic resin.

Examples of the other monomer that is copolymerizable with methyl methacrylate used in the present invention include acrylic acid esters such as methyl acrylate, ethyl acrylate and butyl acrylate, methacrylic acid esters such as ethyl methacrylate, propyl methacrylate, butyl methacrylate, cyclohexyl methacrylate, cyclodecyl methacrylate, phenyl methacrylate, 2,4,6-tribromophenyl methacrylate, fluoroalkyl methacrylate and benzyl methacrylate, styrene, monomethylstyrene, α-methylstyrene, and aromatic vinyl compounds such as vinyl toluene.

In order to produce the above-described polymer with suspension polymerization, the present invention uses the polymeric dispersant (A) and the inorganic salt and/or organic salt (B) thereby producing a resin having satisfactory hue and transparency.

Suspension polymerization is carried out in the present invention under reaction conditions such as a reaction temperature of preferably 40 to 130° C., more preferably 50 to 80° C. If the reaction temperature is too low, polymerization would not proceeds. If the reaction temperature is too high, the system would be dangerous because it would rapidly generate heat and be pressurized. The reaction time is preferably from 3 to 8 hours, more preferably from 4 to 6 hours. If the reaction time is too short, the conversion rate would be low. If the reaction time is too long, the productivity would be reduced.

Upon suspension polymerization, the weight ratio of the monomer phase and the water phase is usually monomer phase/water phase=1/10 to 1/1 but preferably 1/3 to 1/1 in view of the productivity.

No particular limitation is imposed on the polymerization initiator that can be used in the present invention if it is a radical polymerization initiator which is soluble in the monomer. Examples of the polymerization initiator include azo initiators such as 2,2'-azobisisobutyronitrile and 2,2'-azobis (2,4-dimethylvaleronitrile) and peroxides such as dimethyl 2,2'-azobisisobutylate, lauroyl peroxide, bis(4-t-butylcyclohexyl)peroxydicarbonate, 1,1,3,3-tetramethylbutyl peroxy-2-ethylhexanoate, benzoyl peroxide, t-butyl peroxyisobutyrate and acetyl peroxide.

The methacrylic resin (fine particles) that can be produced by the method of the present invention is mainly used as a shaping material, and a chain transfer agent is preferably used to control the polymerization degree of a copolymer. Examples of chain transfer agent used for this purpose include mercaptanes such as n-butylmercaptane, n-octylmercaptane and n-dodecylmercaptane, thioglycolic acid and thioglycolic acid esters. The use of aromatic mercaptanes is not preferable because the aromatic mercaptanes in a large amount remain in the resin and the resulting shaped article becomes yellowish. Alkylmercaptanes are used in an amount of 0 to 1.5 part by weight on the basis of 100 parts by weight of the monomer or monomer mixture and preferably in an amount of 0.1 to 0.5 part by weight in the case of producing a polymer with a sufficiently excellent resistance to thermal decomposition.

The methacrylic resin (fine particles) produced by the method of the present invention has a weight-average molecular weight of preferably 50000 to 300000, more preferably 100000 to 250000. If the molecular weight is less than 50000, the resulting film would be fragile and thus be insufficient in mechanical strength. If the molecular weight is more than 300000, the melt viscosity would be high upon shaping and thus problems concerning an increase in resin pressure or degradation of the resin by shear would arise.

The methacrylic resin (fine particles) produced by the method of the present invention can be pelletized with a vent-type extruder in a conventional manner, and then formed into a film with melt extrusion. The melt extrusion temperature is preferably 130° C. or higher and 300° C. or lower, more preferably 150° C. or higher and 280° C. or lower. If the extrusion temperature is lower than 130° C., the polymer particles would not be melted or kneaded sufficiently and remains as an unmelted object in the film. If the extrusion temperature is higher than 300° C., it may cause problems that the resulting film colors to yellow due to thermal decomposition and monomers generated by decomposition adheres to a die lip.

The resulting extruded film may undergo a stretching process so as to improve the mechanical strength or align the molecular chain to obtain desired optical characteristics. Stretching may be inter-roll longitudinal stretching using a rolling speed difference or lateral stretching with a tenter device and alternatively may be sequential biaxial stretching which is the combination thereof. Further alternatively, a simultaneous biaxial stretching device may be used, wherein in a tenter stretching device, the space between the clips holding film ends is also extended in the machine direction of the film. The stretching device may be in an integrated line with an extrusion film forming device, where the raw film material is reeled up by the extrusion film forming device and delivered off-line to the stretching device to be stretched. The stretching temperature is preferably Tg+2° C. or higher and Tg+20° C. or lower based on the glass-transition temperature Tg (° C.) of the raw polymer film. More preferably, the stretching temperature is Tg+5° C. or higher and Tg+15° C. or lower. If the stretching temperature is lower than Tg+2° C., it may cause problems that the film breaks during stretching or the film haze is likely to increase. If the stretching temperature is higher than Tg+20° C., the polymer main chain is unlikely to be aligned and even though the film is stretched, the polymer main chain may not be aligned sufficiently. The draw ratio is preferably in the range of 1.4 time or greater and 6.0 times or less by area ratio. If the draw ratio is less than 1.4 time by area ratio, aligning of the polymer main chain would give almost no effect to improve the flex resistance of the film. If the draw ratio is greater than 6.0 times by area ratio, it may cause problems that the film is clouded or breaks.

The film after undergoing the above-described film forming process has a thickness of preferably 10 μm or greater and 150 μm or less, more preferably 15 μm or greater and 120 μm or less. More preferably, the film thickness is in the range of 20 μm or greater and 100 μm or less. If the thickness of the film after the stretching process is less than 10 μm, it may cause problems that during a process of laminating with an optical film on a polarizer, the film would be poor in handling characteristics. If the thickness is greater than 150 μm, it may cause problems that the haze increases or the material cost per unit area increases.

In the method of the present invention, a lubricant, dyestuff and pigment, ultraviolet absorber or thermal stabilizer may be added during polymerization or pelletization.

The methacrylic resin (fine particles) produced by the method of the present invention is excellent in transparency and chromaticity and extremely small in haze upon film formation and thus suitable for the use of optical films such as polarizer protection film and optical compensation retardation film for a liquid crystal display.

EXAMPLES

Hereinafter, the present invention will be further described in more details with reference to the following examples but are not limited thereto. The evaluation of physical properties and measurement in the examples were carried out in accordance with the following (1) to (6) methods.

(1) Average Particle Diameter

The average particle diameter was determined by measuring a slurry solution after completion of polymerization, with a laser diffraction particle size analyzer LS13-320 manufactured by Beckman Coulter, Inc.

(2) Internal Haze

Haze can be separated to that in the film interior and that on the surface, and the internal haze refers to haze generated depending on the scattering factor of the film interior and the interior refers to a portion 5 μm or deeper from the film surface. If a film is used as an optical film, it is required to have a lower haze.

The internal haze was measured in accordance with JIS K-7136 as described below.

First of all, blank haze 1 of the measuring device excluding a film was measured.

A droplet of glycerin is dripped onto a glass slide on which a cover glass is then placed. The glass slide is set on NDH5000 haze meter manufactured by NIPPON DENSHOKU INDUSTRIES CO., LTD. to measure blank haze 1.

Next, haze 2 of a sample was measured with the following procedures:

1. Glycerin is dripped on a glass slide, on which a sample film to be measured is then placed so that no bubble enters therebetween;

2. Glycerin is dripped on the sample film, on which a cover glass is then placed;

3. The laminate as prepared above (from the top, cover glass/glycerin/sample film/glycerin/glass slide) is set on the haze meter to measure haze; and 4. (haze 2)−(haze 1)=(internal haze of optical film) is calculated.

(3) fish eyes: the resulting resin was formed into a film with a thickness of 50 μm with a melt extrusion method and the number of fish eye per 50 mm×50 mm was counted. The evaluation criteria are as follows.

Excellent: 0 to 5 fish eyes
Good: 6 to 19 fish eyes
Bad: 20 or more fish eyes (4) b* value The b* value was measured with Spectrophotometer SD6000 manufactured by NIPPON DENSHOKU INDUSTRIES CO., LTD.

(5) Solution Viscosity

The solution viscosity was measured with RE-85 viscometer manufactured by TOKI SANGYO CO., LTD.

(6) Molecular Weight Measurement

The molecular weight was measured with HLC-8220 manufactured by Tosoh Corporation.

Dispersants (1) to (8), methyl methacrylate alone and monomer mixtures containing methyl methacrylate as one component used in the examples were prepared as follows.

[1] 40 mol % potassium saponified-methyl methacrylate: dispersant (1)

Into a 2 L separable flask were charged 75.4 g of potassium hydroxide and 572 g of an ion-exchanged water, and 285.5 g of methyl methacrylate were then added thereto under a nitrogen atmosphere, at room temperature, stirring. After continuing stirring for two hours, the flask was heated to 80° C. and when the internal temperature reached 75° C., 1 g of ammonium persulfate was added. After 8 hours, 937 g of ion-exchanged water were added to dilute the mixture thereby producing a clouded solution with a viscosity of 206 mPas (25° C.)

[2] 60 mol % potassium saponified-methyl methacrylate: dispersant (2)

Into a 2 L separable flask were charge 113.7 g of potassium hydroxide and 572 g of an ion-exchanged water, and 285.5 g of methyl methacrylate were then added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 1324 g of an ion-exchanged water were added to dilute the mixture thereby producing a clouded solution with a viscosity of 281 mPas (25° C.)

[3] 80 mol % potassium saponified-methyl methacrylate: dispersant (3)

Into a 2 L separable flask were charged 150.8 g of potassium hydroxide and 572 g of an ion-exchanged water, and 285.5 g of methyl methacrylate were then added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 1033 g of an ion-exchanged water were added to dilute the mixture thereby producing a clouded solution.

[4] 60 mol % sodium saponified-methyl methacrylate: dispersant (4)

Into a 2 L separable flask were charged 68.5 g of sodium hydroxide and 572 g of an ion-exchanged water, and 285.5 g of methyl methacrylate were added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 1006 g of an ion-exchanged water were added to dilute the mixture thereby producing a clouded solution with a viscosity of 451 mPas (25° C.)

[5] 60 mol % lithium saponified-methyl methacrylate: dispersant (5)

Into a 2 L separable flask were charged 71.9 g of lithium hydroxide and 572 g of an ion-exchanged water, and 285.5 g of methyl methacrylate were then added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 803 g of an ion-exchanged water were added to dilute the mixture thereby producing a clouded solution with a viscosoty of 251 mPas (25° C.)

[6] 60 mol % potassium saponified-methyl acrylate: dispersant (6)

Into a 2 L separable flask were charged 113.7 g of potassium hydroxide and 572 g of an ion-exchanged water, and 245.5 g of methyl acrylate were then added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 1165 g of an ion-exchanged water were added to dilute the mixture thereby producing a clouded solution with a viscosity of 281 mPas (25° C.)

[7] 60 mol % potassium saponified-butyl methacrylate: dispersant (7)

Into a 2 L separable flask were charged 113.7 g of potassium hydroxide and 572 g of an ion-exchanged water, and 406.0 g of butyl methacrylate were then added thereto under a nitrogen atmosphere, at room temperature, stirring. After continuing stirring for 2 hours, the flask was heated to 80° C., and when the internal temperature reached 75° C., 1 g of ammonium persulfate was added. After 8 hours, 1450 g of an ion-exchanged water were added to dilute the mixture thereby producing a clouded solution with a viscosity of 201 mPas (25° C.)

[8] 60 mol % potassium saponified-octyl methacrylate: dispersant (8)

Into a 2 L separable flask were charged 113.7 g of potassium hydroxide and 572 g of an ion-exchanged water, and 566.1 g of octyl methacrylate were then added under a nitrogen atmosphere, at room temperature, stirring. After continuing stirring for 2 hours, the flask was heated to 80° C., and when the internal temperature reached 75° C., 1 g of ammonium persulfate was added. After 8 hours, 1838 g of an ion-exchanged water were added to dilute the mixture thereby producing a solution with a viscosity of 197 mPas (25° C.)

Example 1

Into a 5 L separable flask were charged 1 kg of a monomer solution of 95 parts by weight of methyl methacrylate, 5 parts by weight of methyl acrylate, 1 part by weight of bis(4-t-butylcyclohexyl)peroxydicarbonate (product name: PEROYL TCP, manufactured by NOF CORPORATION) and 0.1 part by weight of n-octylmercaptane and 2.5 kg of pure water dissolving 20 g of an aqueous solution of 16.5 weight % of dispersant (1) prepared above, 10 g of sodium dihydrogenphosphate and 5 g of disodium hydrogenphosphate, and then the mixture was stirred under a nitrogen atmosphere and then polymerized at a polymerization temperature of 65° C. After 2 hours from the initiation of polymerization, the temperature was raised to 80° C. and then the mixture was kept for 2 hours thereby completing the polymerization. The resulting methacrylic resin particles (hereinafter, referred to as methacrylic particles) were recovered after filtration, washing and drying steps, and then subjected to a weight-average molecular weight measurement with GPC and found to have a weight-average molecular weight of 160000.

The polymerization system did not have any bubbling and was extremely stable. Uniform beads with an average particle diameter of 0.38 mm were produced in good yield, and the polymer adhered to polymerization tank wall surfaces or stirring blades in such an amount that it caused no problem. The beads were washed with water and dried and then formed into film with a thickness of 50 μm at 230° C. with a 15 mmφ vent-type extruder manufactured by TECHNOVEL CORPORATION to be subjected to various evaluations.

Example 2

The same procedures as those of Example 1 except for changing the amount of bis(4-t-butylcyclohexyl)peroxydicarbonate (product name: PEROYL TCP manufactured by NOF CORPORATION) to 3 parts by weight were followed thereby producing methacrylic particles with a weight-average molecular weight of 100000, which were then formed into a 50 μm thick film to be subjected to various evaluations.

Example 3

The same procedures as those of Example 1 except for changing the amount of bis(4-t-butylcyclohexyl)peroxydicarbonate (product name: PEROYL TCP manufactured by NOF CORPORATION) to 0.3 part by weight were followed thereby producing methacrylic particles with a weight-average molecular weight of 260000, which were then formed into a 50 μm thick film to be subjected to various evaluations.

Example 4

The same procedures as those of Example 1 except for changing the dispersant to (2) were followed thereby producing methacrylic particles with a weight-average molecular weight of 170000, which were then formed into a 50 μm thick film to be subjected to various evaluations.

Example 5

The same procedures as those of Example 1 except for changing the dispersant to (3) were followed thereby producing methacrylic particles with a weight-average molecular weight of 180000, which were then formed into a 50 μm thick film to be subjected to various evaluations.

Example 6

The same procedures as those of Example 1 except for changing the dispersant to (4) were followed thereby producing methacrylic particles with a weight-average molecular weight of 150000, which were then formed into a 50 μm thick film to be subjected to various evaluations.

Example 7

The same procedures as those of Example 1 except for changing the dispersant to (5) were followed thereby producing methacrylic particles with a weight-average molecular weight of 160000, which were then formed into a 50 μm thick film to be subjected to various evaluations.

Example 8

The same procedures as those of Example 1 except for changing the dispersant to (6) were followed thereby producing methacrylic particles with a weight-average molecular weight of 170000, which were then formed into a 50 μm thick film to be subjected to various evaluations.

Example 9

The same procedures as those of Example 1 except for changing the dispersant to (7) were followed thereby producing methacrylic particles with a weight-average molecular weight of 170000, which were then formed into a 50 μm thick film to be subjected to various evaluations.

Example 10

The same procedures as those of Example 1 except for changing the dispersant to (8) were followed thereby producing methacrylic particles with a weight-average molecular weight of 160000, which were then formed into a 50 μm thick film to be subjected to various evaluations.

Example 11

The same procedures as those of Example 1 except for changing 10 g of sodium dihydrogenphosphate and 5 g of disodium hydrogenphosphate to 15 g of acidic calcium phosphate were followed thereby producing methacrylic particles with a weight-average molecular weight of 150000, which were then formed into a 50 μm thick film to be subjected to various evaluations.

Example 12

The same procedures as those of Example 1 except for changing the monomer formulation to that of 52 parts by weight of methyl methacrylate, 42 parts by weight of 2,2,2-trifluoroethyl methacrylate and 6 parts by weight of benzyl methacrylate were followed thereby producing methacrylic particles with a weight-average molecular weight of 160000, which were then formed into a 50 μm thick film to be subjected to various evaluations.

Example 13

The same procedures as those of Example 1 except for changing the monomer formulation to that of 85 parts by weight of methyl methacrylate, 10 parts by weight of phenoxyethylmethacrylate and 5 parts by weight of phenoxyethylacrylate were followed thereby producing methacrylic particles with a weight-average molecular weight of 160000, which were then formed into a 50 μm thick film to be subjected to various evaluations.

Example 14

The same procedures as those of Example 1 except for changing 10 g of sodium dihydrogenphosphate and 5 g of disodium hydrogenphosphate to 15 g of sodium acetate were followed thereby producing methacrylic particles with a weight-average molecular weight of 150000, which were then formed into a 50 μm thick film to be subjected to various evaluations.

Example 15

The same procedures as those of Example 1 except for changing 10 g of sodium dihydrogenphosphate and 5 g of disodium hydrogenphosphate to 15 g of sodium sulfate were followed thereby producing methacrylic particles with a weight-average molecular weight of 150000, which were then formed into a 50 μm thick film to be subjected to various evaluations.

Comparative Example 1

The same procedures as those of Example 1 except for changing the dispersant to polyvinyl alcohol were followed thereby producing methacrylic particles with a weight-average molecular weight of 160000, which were then formed into a 50 μm thick film to be subjected to various evaluations.

Comparative Example 2

The same procedures as those of Example 1 except for changing the dispersant to a methoxy ethylene/maleic anhydride copolymer dispersant (product name: GANTREZ AN119, manufactured by ISP Japan Ltd) were followed thereby producing methacrylic particles with a weight-average molecular weight of 170000, which were then formed into a 50 μm thick film to be subjected to various evaluations.

Comparative Example 3

The same procedures as those of Example 1 except for changing the monomer formulation to that of 52 parts by weight of methyl methacrylate, 42 parts by weight of 2,2,2-trifluoroethyl methacrylate and 6 parts by weight of benzyl methacrylate and the dispersant to polyvinyl alcohol (product name: PVA217EE, manufactured by KURARAY CO., LTD.) thereby producing methacrylic particles with a weight-average molecular weight of 150000, which were then formed into a 50 μm thick film to be subjected to various evaluations.

TABLE 1

|  | internal haze (%) | b* | film appearance | fish eyes | beads shape | average particle (μm) |
|---|---|---|---|---|---|---|
| Example 1 | 0.06 | 0.13 | colorless transparent | excellent | uniform excellent | 480 |
| Example 2 | 0.06 | 0.13 | colorless transparent | excellent | uniform excellent | 430 |
| Example 3 | 0.06 | 0.13 | colorless transparent | excellent | uniform excellent | 460 |
| Example 4 | 0.05 | 0.13 | colorless transparent | excellent | uniform excellent | 430 |
| Example 5 | 0.05 | 0.13 | colorless transparent | excellent | uniform excellent | 770 |
| Example 6 | 0.06 | 0.13 | colorless transparent | excellent | uniform excellent | 460 |
| Example 7 | 0.05 | 0.14 | colorless transparent | excellent | uniform excellent | 550 |
| Example 8 | 0.05 | 0.13 | colorless transparent | excellent | uniform excellent | 440 |
| Example 9 | 0.07 | 0.12 | colorless transparent | excellent | uniform excellent | 480 |
| Example 10 | 0.06 | 0.13 | colorless transparent | excellent | uniform excellent | 544 |
| Example 11 | 0.05 | 0.13 | colorless transparent | excellent | uniform excellent | 460 |
| Example 12 | 0.05 | 0.13 | colorless transparent | excellent | uniform excellent | 720 |
| Example 13 | 0.04 | 0.10 | colorless transparent | excellent | uniform excellent | 390 |
| Example 14 | 0.05 | 0.14 | colorless transparent | excellent | uniform excellent | 480 |
| Example 15 | 0.06 | 0.13 | colorless transparent | excellent | uniform excellent | 520 |
| Comparative Example 1 | 0.11 | 0.18 | colorless transparent | bad | uniform excellent | 260 |
| Comparative Example 2 | 0.21 | 2.07 | yellow transparent | good | ununiform | |
| Comparative Example 3 | 0.38 | 0.13 | slightly clouded | bad | uniform excellent | 240 |

INDUSTRIAL APPLICABILITY

The present invention can produce a methacrylic resin (fine particles) for an optical film that can be formed to an optical component with excellent transparency and chromaticity, using suspension polymerization and thus is economically efficient.

The invention claimed is:

1. A method for producing a methacrylic resin for an optical film, comprising adding (A) a polymeric dispersant represented by formula (1) below and (B) an inorganic salt and/or organic salt selected from alkali metal salts, alkaline earth metal salts and ammonium salts when methyl methacrylate alone or a monomer mixture containing methyl methacrylate as one component is subjected to suspension-polymerization:

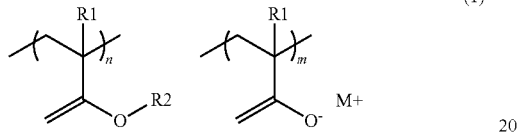
(1)

($n=10$ to $60$ mol %, $m=40$ to $90$ mol %, $R_1$ is hydrogen or a methyl group, $R_2$ is an alkyl group having 1 to 8 carbon atoms, and M is an alkali metal or alkaline earth metal or $NH_4$).

2. The method according to claim 1 wherein the polymeric dispersant (A) is a water soluble polymer comprising 40 to 90 mol % of an acrylic acid salt unit and/or methacrylic acid salt unit of at least one type selected from lithium, sodium, potassium, calcium and ammonium salts of acrylic acid and/or methacrylic acid and 10 to 60 mol % of an acrylic acid alkyl ester unit and/or methacrylic acid alkyl ester unit, having an alkyl group having 1 to 8 carbon atoms.

* * * * *